(No Model.)
A. A. EHRICH.
PROCESS OF PREPARING CANE REEDS FOR WEAVING.
No. 412,737. Patented Oct. 15, 1889.
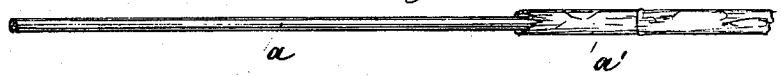
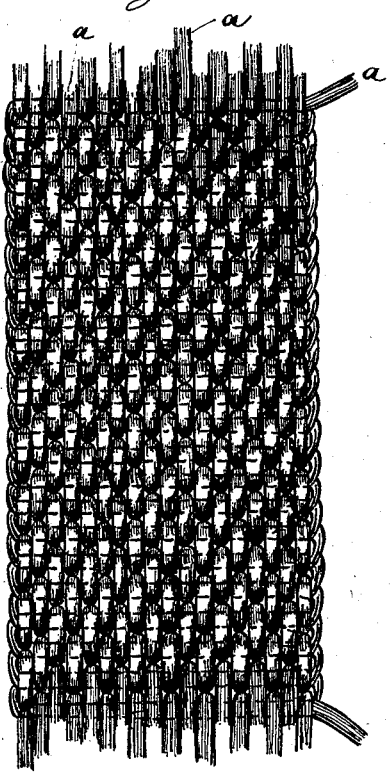
Witnesses.
Inventor.

UNITED STATES PATENT OFFICE.

ANDREAS AUGUST EHRICH, OF LEIPSIC, GERMANY.

PROCESS OF PREPARING CANE REEDS FOR WEAVING.

SPECIFICATION forming part of Letters Patent No. 412,737, dated October 15, 1889.

Application filed September 21, 1886. Serial No. 214,123. (No specimens.)

*To all whom it may concern:*

Be it known that I, ANDREAS AUGUST EHRICH, a citizen of Germany, residing at Leipsic, in the Empire of Germany, have invented a new and Improved Process of Preparing Cane Reeds for Weaving, of which the following is a specification.

This invention relates to an improved process of preparing cane for weaving; and it consists in the features of improvement more fully pointed out in the claim.

In the accompanying drawings, Figure 1 represents a piece of cane partly prepared according to my invention. Fig. 2 represents a piece of fabric for a band or belt woven with cane prepared according to my invention.

In carrying out my invention I take a piece of cane or reed *a*—such as bamboo, rattan, &c.—and strip it by suitable machines of its outer skin. The remaining central part is then split and impregnated or saturated with a mixture of lye and glycerine. This mixture softens the cane and renders it pliable. It is now in condition to be mashed or flattened between a pair of rollers, through which it is drawn. This completes the operation and puts the cane in condition to be woven into various fabrics.

In Fig. 2 the prepared cane is shown to be used as a warp in a belt or band with any suitable weft.

I claim as my invention—

The process of preparing cane reeds for weaving, which consists in removing the skin, splitting the cane, impregnating it with a softening mixture, and mashing it, substantially as specified.

In testimony whereof I have signed my name to this specification in the presence of two subscribing witnesses.

ANDREAS AUGUST EHRICH.

Witnesses:
    J. V. BRIESEN,
    OTTO SACH.